United States Patent Office 3,023,183
Patented Feb. 27, 1962

3,023,183
ESTERIFICATION
Douglas C. Nelson, Chicago, Ill., assignor to The Cuban-American Sugar Company, New York, N.Y., a corporation of New Jersey
No Drawing. Filed June 29, 1959, Ser. No. 823,349
21 Claims. (Cl. 260—30.2)

The instant invention relates to an improvement in esterification, and more particularly, to an improved solvent medium for carrying out esterification reactions.

Broadly speaking, esterification includes all processes by which esters are produced; but the instant invention is concerned primarily with esterification reactions involving the reaction of alcohols and acids or the reaction of either of these types of compounds with an ester, so as to obtain a reaction product which includes an ester. These reactions may be shown in the following equations:

REACTION 1

Acid + Alcohol ⇌ Ester + Water
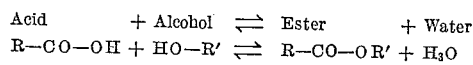
R—CO—OH + HO—R′ ⇌ R—CO—OR′ + H₂O

REACTION 2.—ALCOHOLYSIS

Ester A + Alcohol X ⇌ Ester B + Alcohol Y
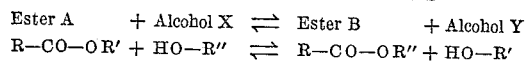
R—CO—OR′ + HO—R″ ⇌ R—CO—OR″ + HO—R′

REACTION 3.—ACIDOLYSIS

Ester A + Acid X ⇌ Ester C + Acid Y
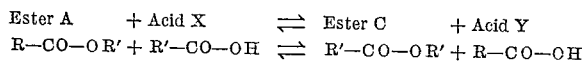
R—CO—OR′ + R′—CO—OH ⇌ R′—CO—OR′ + R—CO—OH The foregoing Reactions 1, 2 and 3 are all well known in the art and these reactions present a number of related problems. First of all, it is important to carry out each of these reactions in a non-aqueous atmosphere that is inert with respect to the reactants and reaction products. Reactions 2 and 3 can be carried out in a substantially anhydrous reaction mix, and Reaction 1 is carried out under conditions which assist in the removal of the water reaction product (such as temperatures above the boiling point of water). Although there are a number of specific problems related to individual reactants which may be used in any of the foregoing reactions, certain problems are common to these reactions and one of which is the difficulty of controlling many of these reactions or the difficulty of carrying out such reactions at reasonable temperatures. Since no non-aqueous solvents have been found adequate heretofore to carry out many of these reactions, it has been necessary to carry out the reactions employing only the individual reacting ingredients in the reaction mixture. Thus, in the case of the esterification of phthalic acid and ethylene glycol (to form the so-called "alkyds") the individual ingredients are reacted together to form a rather viscous mass which releases the water in the form of steam bubbles only with difficulty. The instant invention, however, provides a solvent medium which effects a very substantial reduction in the viscosity of a phthalic acid- ethylene glycol reaction mass and greatly facilitates the carrying out of the reaction. In the case of other acid-alcohol systems wherein either the acid or the alcohol is not miscible in its co-reactant at ordinary temperatures, extremely high temperatures may be required in order to carry out the esterification reaction and such high temperatures might be harmful to the reactants (so as to cause thermal decomposition thereof). Also, the instant invention provides a solvent which has very great hygroscopic properties so as to tend to withdraw the water reaction product from the system thereby shifting the equilibrium balance to the right in the equation of Reaction 1. Further, the instant solvent has a boiling point substantially above that of water, so that it may be used in a reaction system heated above the boiling point of water so as to facilitate escape of the water reaction product or any water which might be contained in a technical grade of one of the reactants.

Although it will be noted that Reactions 1, 2 and 3 have been shown in connection with carboxylic acids and the esters resulting therefrom, it will be appreciated that inorganic acids may also be used in comparable reactions to obtain corresponding esters of inorganic acids.

Another particularly important feature of the instant invention resides in the fact that the instant invention provides a solvent which, in anhydrous condition, is effective to dissolve an ester and either an alcohol or acid which might be reacted therewith to produce another ester in accordance with Reactions 1, 2 and 3. This permits all of the advantages of a reaction in solution without the problem of having a reactive solvent or an aqueous solvent medium which would materially reduce the yield.

The instant invention is based primarily upon the discovery that the lower dialkyl sulfoxides

wherein R and R′ are each C₁–C₄ alkyl groups, have unusual solvent properties with respect to acids, alcohols and esters. Furthermore, dimethyl sulfoxide (i.e. the lowest member) has a boiling point of approximately 190° C., which is substantially above that of water; and the dialkyl sulfoxides have extremely hygroscopic properties so as to assist in the removal of water from the present reaction system in any of the aforementioned Reactions 1, 2 and 3.

It is, therefore, an important object of the instant invention to provide an improvement in esterification reactions.

It is a further important object of the instant invention to provide an esterification reaction of the class consisting of (1) reacting an alcohol with an acid, (2) reacting an ester with an acid and (3) reacting an ester with an alcohol by carrying out such reactions in solution in a lower sulfoxide, particularly a dialkyl sulfoxide.

Another object of the present invention is to provide a method whereby fatty esters of certain saccharides described hereinafter can be prepared in good yield in a minimum of time and under reaction conditions which will not substantially adversely affect the organic reactants.

Other objects, features and advantages of the present invention will become apparent to those skilled in the art from the following detailed disclosure thereof.

The instant invention consists in a process of carrying out an esterification reaction in solution in a lower sulfoxide and such esterification reaction may involve the reaction of an alcohol with an acid to produce an ester or the reaction of an ester with an acid or an alcohol to produce another ester. Dimethyl sulfoxide is preferred.

The first class of reactions to be considered herein is the reaction of an alcohol with an acid to produce an ester. The alcohols which may be used in this type of reaction include all alcohols which do not have reactive groups in their molecules that are more reactive (with respect to the acid, ester, sulfoxide, or other alcohol molecules) than the hydroxy groups. Such alcohols include monohydric alcohols wherein a single hydroxy group is attached to a hydrocarbon aliphyl group (i.e., aliphatic or cycloaliphatic) or an aromatic hydrocarbon group, or combinations of both of such groups, such as aralkyl or alkaryl groups. In general, the number of carbon atoms contained in the alcohol molecule may range from 1 to as much as 27, although it is ordinarily preferable to use $C_1$–$C_{18}$ alcohols. In certain instances the high molecular weight alcohols, such as those obtained from the hydrolysis of lanolin to produce the so-called "lanolin alcohols" may be used to particular advantage, and these alcohols range from about $C_{16}$ or cetyl alcohol up to the very high molecular weight alcohol such as ceryl alcohol ($C_{26}$) and free cholesterol itself $$(C_{27}H_{45}OH)$$

The sterols, which include cholesterol, isocholesterol and the like may be combined with certain acids to produce esters which have uses in the cosmetics industry. A commercial product which has been available for some time known by the trade name "Lanolin Alcohols" is a mixture of the alcohols upon saponification of lanolin and this material contains about 35% free cholesterol (or isocholesterol).

Other examples of alcohols which may be used to advantage in the practice of the instant invention include methyl, ethyl, propyl, butyl, allyl and benzyl alcohols, dimethyl carbinol, methyl ethyl carbinol, diethyl carbinol, methyl hexyl carbinol, diallyl carbinol, menthol, trimethyl carbinol, dimethyl propyl carbinol, phenol and thymol.

The alcohols used may be either primary, secondary or tertiary, so that the butyl alcohols, for example, which may be used include n-butyl, isobutyl, secondary butyl, and tertiary butyl alcohols. For several reasons, it is preferable to use alcohols which have a boiling point higher than that of water (namely, $C_4$ or higher alcohols), but the advantages of the invention may also be obtained using lower boiling alcohols.

Polyhydric alcohols may also be used in the practice of the instant invention to particular advantage, and such alcohols include ethylene glycol, propylene glycol, etc.; diethylene glycol, triethylene glycol, etc.; glycerine, pentaerythritol, sorbitol, sugar (sucrose), etc. In general, the size of the non-hydroxy portion of the polyhydric alcohol molecule may be the same as that for the monohydric alcohols (i.e., up to $C_{27}$, and starting with the minimum of $C_2$). The number of hydroxy groups contained in the polyhydric alcohol molecule may range from 2 to about 6. The number of carbon atoms in the alkylene group of alkylene or polyalkylene glycols used in the practice of the invention is preferably within the range of 2 to 6 carbon atoms (per alkylene group). As indicated, unsaturated as well as saturated alcohols may be used and such unsaturation may be olefinic or aromatic (or less preferably acetylenic) and the instant invention affords an advantage with respect to such alcohols because it permits the use of less drastic esterification conditions (which might otherwise tend to activate certain points of unsaturation in the alcohol molecule).

Certain groups of alcohols which may be used in the practice of the instant invention to obtain superior results include the $C_4$–$C_{18}$ alkanols, the $C_2$–$C_6$ alkanpolyols, and the poly-$C_2$–$C_3$ alkylene glycols, all of which have boiling points higher than that of water.

The acids which may be used in Reaction 1 include all acids which do not have reactive groups in their molecules that are more reactive (with respect to the alcohol, ester, dimethyl sulfoxide, or other acid molecules) than the group to which the acid hydrogen is attached in the molecule. Since extremely strong acids may tend to react with the dimethyl sulfoxide, at least at elevated temperatures, it is generally preferable to use only the recognized relatively weak acids, such as those having a dissociation constant of about $4 \times 10^{-2}$, which includes substantially all carboxylic acids, such as acetic, benzoic, butyric, carbonic, citric, formic, fumaric, isobutyric, isovaleric, lactic, maleic, malic, malonic, mandelic, naphthoic, oxalic, phthalic, propionic, pyrotartaric, salicylic, succinic, tartaric, and valeric. Such acids also include the comparably weak inorganic acids such as boric, arsenic, selenius and tellurous acids. The carboxylic acids which may be used include monocarboxylic acids wherein a single carboxylic group is attached to a hydrocarbon aliphyl group (i.e., aliphatic or cycloaliphatic) or an aromatic hydrocarbon group, or combinations of both of such groups, such as the aralkyl or alkaryl groups. In general, the number of carbon atoms contained in the carboxylic acid molecule may range from 1 to as much as 24, although it is ordinarily preferable to use $C_2$–$C_{19}$ carboxylic acids (all of which have boiling points above that of water). Among the higher molecular weight carboxylic acids useful in the practice of the instant invention are abietic acid ($C_{19}$), the saturated fatty acids (which include caproic, caprylic, capric, lauric, myristic, palmitic, stearic, arachidic, behenic, and lignoceric) and the unsaturated fatty acids (which include myristoleic, palmitoleic, oleic, linoleic, linolenic, ricinoleic, etc.).

In general, the groups attached to the alcoholic hydroxy group in the alcohol and the carboxylic acid group in the carboxylic acid may be saturated or unsaturated hydrocarbon groups which preferably do not contain substituents other than hydroxy groups or ether groups, such as a methoxy group in methyl salicyl which may be used as an alcohol or methoxy acetic acid, or ketone or oxo linkages, such as in salicyl resorcinol or benzoyl acetic acid, or carboxyl groups (i.e. COO) such as in glyceryl mono palmitate or in alkyd chains or in dicarboxylic acids. In other words, the group attached to the alcoholic hydroxy group or the carboxylic acid group in the alcohol or acid, respectively, used in the practice of the instant invention preferably contains no atoms other than carbon, hydrogen and oxygen, and the oxygen atoms being present only in hydroxy, ether or ketone groups.

In the practice of the instant invention, the esterification reaction may be accelerated by heating, as hereinbefore explained, preferably to a temperature above that at which water boils and below the boiling point of the dialkyl sulfoxide, although temperatures above the boiling point of the dialkyl sulfoxide can be used if necessary. An advantage of the instant invention resides in the fact that the dialkyl sulfoxide functioning as a solvent affords much more rapid intimate contact between the reactants so as to permit the use of lower temperatures than might be required ordinarily in the esterification reactions. Also, the ordinary esterification catalysts may be used. Most preferably the catalysts used include para-toluene sulfonic acid or certain halides such as boron fluoride or silicon fluoride. Actually, the dialkyl sulfoxide itself functions in a way as a catalyst in that it has such a great attraction for water that it shifts the equilibrium of the esterification reaction toward the production of the ester.

Certain additional liquids may be used to assist in the removal of water through the formation of low boiling azeotropes, such as by the incorporation of benzene or toluene in the reaction mixture. These ingredients form azeotropes which boil at temperatures even below the boiling point of water and which thereby assist in removing the water from the system.

In the case of the formation of glycerides of relatively non-volatile acids (such as the higher fatty acids and rosin), it has heretofore been the practice to use temperatures above the boiling point of water and to bubble an inert gas through the reaction mixture in order to assist in the removal of water. The use of the dialkyl sulfoxide in such a reaction mixture greatly reduces the viscosity thereof and greatly facilitates the escape of water from the reaction mixture. The same is true using other polyalcohols, such as the glycols, polyglycols, pentaerythritol or sugar, which may be reacted with other high boiling acids such as abietic acid, stearic acid, or the like, in order to obtain partial or complete esterification of the polyalcohols.

Another advantageous feature of the instant invention resides in the use thereof in connection with the preparation of alkyd resins, by reaction between polyhydric alcohols (and preferably dihydric alcohols) and polybasic acids (and preferably dibasic acids). In general, the essential materials used are ethylene glycol and phthalic acid or anhydride in the alkyd formation, and modifications in certain characteristics in the alkyd may be imparted by substituting propylene glycol for up to 50% of the ethylene glycol (i.e., the percents herein being in molar percent) and by substituting maleic acid or anhydride for up to 50% of the phthalic acid or anhydride. In carrying out the alkyd formation, the reaction mass ordinarily tends to become quite viscous and difficulties encountered in removal of all of the water formed as a by-product, but this can be avoided in the practice of the instant invention by the use of the dialkyl sulfoxide to dissolve the reactants. Also, the dialkyl sulfoxide affords an additional control feature in that the alkyd resin molecule will ultimately reach such a size that it will no longer be soluble in the dialkyl sulfoxide. In this way, the amount of dialkyl sulfoxide may be determined for a given reaction mixture which will permit the precipitation of an alkyd resin when it has reached a given molecular weight. In this way, reaction can be terminated at a predetermined point in the alkyd formation.

With respect to Reactions 2 and 3, it will be appreciated that any of the alcohols or acids hereinbefore disclosed may be used with an ester formed by reacting any of the aforementioned alcohols with any of the aforementioned acids. As will be appreciated, the "ester" reactant used in Reactions 2 and 3 is essentially a monomeric ester and not a polymeric form which may be reacted, as in the case of the alkyd resins, to such a highly polymeric state that it is substantially inert. In general, the Friedel-Crafts catalysts may be used in these reactions also in order to carry out the acidolysis of Reaction 3 and alkalis and other esterification catalysts, such as the sodium alcoholate, may be used in carrying out the alcoholysis reactions of Reaction 2. A particularly advantageous feature in connection with Reactions 2 and 3 is that the dialkyl sulfoxide may be employed in substantially anhydrous condition (i.e., less than 0.1% moisture content) so that the reaction may be greatly facilitated by the presence of a solvent without the necessity of having moisture present.

In the category of Reaction 2 the interesterification of oligosaccharides with fatty acid esters is of particular importance. The term oligosaccharides is used herein to differentiate the di, tri and tetra-saccharides as a group, from the polysaccharides which are composed of a much greater number of single units. Of the oligosaccharides, only those of the non-reducing type, i.e., those having no potentially free aldehyde of ketonic group, are suitable for purposes of this invention. These include the disaccharides; sucrose, trehalose and glucoxylose; the trisaccharides; raffinose, melezitose and gentianose; and the tetra-saccharide; stachyose. Thus, the oligosaccharides of concern here are non-reducing polyhydroxy compounds having from 7 to 16 hydroxyl groups per molecule.

Suitable fatty acid esters for the interesterification with the saccharides are the fatty acid esters of primary aliphatic monohydroxy alcohols having from 1 to about 8 carbon atoms, for example, methanol, ethanol, hexanol, and octanol, specific examples being methyl palmitate, ethyl palmitate and octapalmitate. In addition, fatty acid esters of completely or incompletely esterified polyhydric alcohols having from 2 to 6 hydroxyl groups, such as ethylene glycol, glycerol, erythritol, pentaerythritol, mannitol and sorbitol can be employed. Glycol dipalmitate, glycerol, mono-, di-, and tripalmitate, mannitol partial palmitates, erythritol tetrapalmitate, pentaerythritol, tetrapalmitate and sorbitol hexapalmitate are examples of operative fatty esters. In addition, fatty esters of glycosides, such as methyl glucoside tetrapalmitate, can be employed.

In most instances it is preferred that the alcohol moiety of the fatty ester that is reacted with the saccharide should contained not more than 3 carbon atoms. When the alcohol is low boiling, such as methanol, and low pressures are maintained during the interesterification reaction, the alcohol can be removed by distillation from the reaction mixture as it is formed.

Just as mono-and diesters of glycerol can be prepared from the reaction of glycerine with a triglyceride, so incompletely esterified sucrose esters can be prepared by the reaction of a highly esterified sucrose (e.g., the octapalmitate) with sucrose.

The aforementioned polyhydric alcohols and non-reducing oligosaccharides considered as a group will for purposes herein be referred to as polyhydroxy substances.

The length of the fatty acid chain of the esters above designated is not critical and is dictated primarily by the type of fatty acid material source available. The fatty acids containing from about 8 to 22 carbon atoms are useful. Thus, the mixtures of fatty acids obtained from animal, vegetable, and marine oils and fats, such as coconut oil, cottonseed oil, soybean oil, tallow, lard, herring oil, sardine oil, and the like, represent excellent and valuable sources of fatty acid radicals. In the event it is desired to produce oligosaccharide esters of single fatty acids by this invention, then the fatty acid esters of relatively volatile alcohols (e.g., methanol and ethanol), the fatty acid portions of which have from about 12 to about 22 carbon atoms can be reacted with the nonreducing oligosaccharide with the aid of the particular sulfoxide reaction medium herein covered.

In all instances referred to above the crux of the invention lies in the selection of the sulfoxide as a solvent for the reaction medium. Although the amount of sulfoxide required for any given interesterification will vary depending upon the particular solvent which is to be used, the actual amount of sulfoxide is not critical. The proportion of sulfoxide solvent may be varied from ⅓ to 50 times by weight of the fatty ester employed for reaction with the oligosaccharide. The solvent usage is normally adjusted depending upon the particular reactants to be interesterified. Sufficient solvent should be used so that the advantages associated with solvent usage, e.g., rapid interesterification, may be realized.

The catalyst, for example, sodium methoxide, may be advantageously used in amounts from about 0.2% to about 2.0% by weight of the fatty ester which is to be reacted, equimolar amounts of other catalyst being usable. The choice of the catalyst and the amount which is to be used are dependent upon the particular constituents which are to be reacted.

After the interesterification has progressed to substantial completion the catalyst is usually inactivated by neutralization and the sulfoxide and unreacted sucrose are separated from the reaction mixture by conventional procedures such as crystallization, precipitation and distillation.

Temperatures of the order of 100 to 150° C. are suitable for the interesterification of saccharides, a more preferred range being 75° to 125° C. The temperatures used are not critical and are those which are generally maintained in esterification and interesterification reactions. By way of example, the temperature at or above the boiling point of water, 100° C., may be maintained.

Examples of typical formulations for reactions embodying the instant invention include the following:

*Formulation 1*

REACTION MIX 1 mol glycerol
1 mol rosin (abietic acid)
20 mols dimethyl sulfoxide Heated at 170° C. until water stops distilling off and then to 200° C. to remove dimethyl sulfoxide, gives substantially complete yield of ester gum.

Formulation 2
REACTION MIX
1 mol glycerol
2 mol stearic acid
20 mols dimethyl sulfoxide Same procedure as Formulation 1 yields glycerol distearate.

Formulation 3
REACTION MIX
1 mol pentaerythritol
1 mol rosin
20 mols dimethyl sulfoxide Same procedure as Formulation 1 yields pentaerythritol ester gum.

Formulation 4
REACTION MIX
1 mol sugar (sucrose)
1 mol stearic acid
20 mols dimethyl sulfoxide Same procedure as Formulation 1 yields a sugar stearate that does not show discoloration from thermal decomposition.

Formulation 5
REACTION MIX
1 mol ethyl benzoate
1 mol amyl alcohol
20 mols anhydrous dimethyl sulfoxide Heat at above the boiling point of ethanol (about 100° C.) until ethanol has been distilled off, and then separate amyl benzoate from dimethyl sulfoxide by vacuum distillation.

Although it will be noted that the dialkyl sulfoxide referred to primarily herein is dimethyl sulfoxide, because this is the preferred sulfoxide, it will be appreciated that the other dialkyl sulfoxides can be substituted for dimethyl sulfoxide in any of the foregoing portions of this disclosure. Dimethyl sulfoxide is commercially available and it is a better solvent for the lower molecular weight acids and alcohols than are the higher dialkyl sulfoxides, although all of these dialkyl sulfoxides function in a similar manner in most respects. Other dialkyl sulfoxides which can be used include methyl ethyl sulfoxide, diethyl sulfoxide, methyl propyl sulfoxide, methyl isopropyl sulfoxide, dipropyl sulfoxide, methyl butyl sulfoxide, methyl isobutyl sulfoxide, etc., up to dibutyl sulfoxide which is about the highest molecular weight dialkyl sulfoxide which can be used to a practical advantage in the practice of the instant invention. These dialkyl sulfoxides may in each case be used in anhydrous condition or they may contain water, which ordinarily will be driven off during the initial heating of the reactants. Other formulations include the following:

Formulation 6
REACTION MIX
1 mol ethylene glycol
1 mol phthalic acid
20 mols phthalic acid Heat at 170° C., distilling off water, until precipitate starts to form and then increase temperature to 250° C. to remove dimethyl sulfoxide and obtain a resinous alkyd product.

Formulation 7
REACTION MIX
1 mol ethylene glycol
0.1 mol glycerol
1.1 mols phthalic acid
0.1 mol rosin
20 mols methyl ethyl sulfoxide Same as procedure 6 yields a rosin modified alkyd.

Formulation 8
REACTION MIX
1 mol of coconut oil
1 mol of rosin
20 mols of anhydrous diethyl sulfoxide Heat at 170° C. for eight hours, to obtain essentially a mixture of free lauric acid and a mono-abietate dilaurate of glycerol which can be separated.

Formulation 9
REACTION MIX
1 mol of coconut oil
1 mol of rosin
20 mols of dibutyl sulfoxide Heat at 170° C. for eight hours, to obtain essentially a mixture of free lauric acid and a mono-abietate dilaurate of glycerol which can be separated.

It will also be noted that inorganic acids may be used in the instant esterification reactions, as indicated in the following formulations:

Formulation 10
REACTION MIX
1 mol boric acid
3 mols lauryl alcohol
20 mols dimethyl sulfoxide Heat at 170–200° C., until water stops distilling off and then to 200–250° C. to remove dimethyl sulfoxide to give substantially complete yield of lauryl borate.

Formulation 11
REACTION MIX
1 mol boric acid
3 mols sodium isethionate
10–20 mols dimethyl sulfoxide Heat at 130–150° C. as reaction proceeds, then raise to 170–200° C. until water stops distilling off, and then to 200–250° C. to remove dimethyl sulfoxide to give yield of sodium isethionyl borate.

Another advantageous feature of the instant invention resides in its use in connection with the preparation of detergents from fatty acids and sodium isethionate which is a high melting solid that is not soluble in the fatty acid. When reactants are heated together without a solvent, poor mixing, slow reaction and charring will often result. Since the fatty acids and sodium isethionate are soluble in the dialkyl sulfoxides, the use of the instant invention in this process is particularly advantageous, as indicated in the following formulation:

Formulation 12
REACTION MIX
1 mol sodium isethionate
1 mol stearic acid
10–20 mols dimethyl sulfoxide Heat at 170–200° C. until water stops distilling off and then to 200–250° C. to remove dimethyl sulfoxide to give substantially complete yield of sodium stearoyl isethionate.

As indicated hereinbefore, esterification catalysts may be used in any of the aforementioned formulations in the usual small catalytic amounts; and a typical example of the use of hydrogen chloride as a catalyst is indicated in the following formulation:

Formulation 13
REACTION MIX
1 mol amyl alcohol
1 mol stearic acid
0.01 mol hydrogen chloride
20 mols dimethyl sulfoxide Heat at 170–200° C. until water stops distilling off and then to 200–250° C. to remove dimethyl sulfoxide to give yield of amyl stearate.

Other catalysts such as the Friedel-Crafts catalysts may be used in the above reaction, although care should be taken in initially introducing the catalysts into the mix in the case of active catalysts such as $AlCl_3$, $SiCl_4$, $BF_3$, etc.

Although the dialkyl sulfoxides are ordinarily preferred for use in the instant invention, other lower sulfoxides may be used, and these include the heterocyclic sulfoxides wherein the S of the sulfoxide radical is a nuclear atom. Such compounds include 5 to 6 membered rings having 1 to 2 nuclear S atoms and the remainder C atoms, preferably in saturated rings, with 1 to 2 lower alkyl (e.g. methyl) substituents on the C atoms in the ring. A typical type of compound is based on the tetramethylene sulfoxide nucleus:

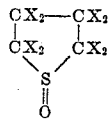

wherein each X is H or a lower alkyl group, but not more than two X's are alkyl groups and the remainder are H's. Examples include tetramethylene sulfoxide, 1-methyl tetramethylene sulfoxide, 2-methyl tetramethylene sulfoxide, 1,3-dimethyl tetramethylene sulfoxide, etc.

Another heterocyclic compound is based on a 6 membered ring:

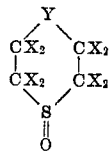

wherein Y is S=O or $CX_2$ and the X's have the meaning hereinbefore given. Examples include pentamethylene sulfoxide, 1-methyl pentamethylene sulfoxide, etc.; and diethylene disulfoxide, 1-methyl diethylene disulfoxide, etc.

The preferred sulfoxides are liquid at room temperature; or at least liquid at about 100° C. (the boiling point of water).

The above mentioned heterocyclic compounds are prepared by oxidizing the corresponding sulfide in accordance with the teachings of United States Letters Patent No. 2,581,050 or No. 2,702,824 to obtain the sulfoxide. In general, only the lower heterocyclic sulfoxides are used in the practice of the instant invention, but the sulfoxides used are all liquids at temperatures below the usual esterification temperatures of about 170° C. for the larger molecular weight esters. The heterocyclic sulfoxides afford an additional advantage in that they possess extremely superior heat stability. A typical formulation is as follows:

*Formulation 14*

REACTION MIX 1 mol ethylene glycol
1 mol phthalic acid
20 mols tetramethylene sulfoxide Heat at 170° C., distilling off water, until no more water is removed and a precipitate starts to form and then increase the temperature to remove the sulfoxide and obtain a resinous alkyd product.

The same results can be obtained using in Formulation 14 pentamethylene sulfoxide or diethylene disulfoxide.

It will be understood that modifications and variations may be effected without departing from the scope of the novel concepts of the present invention.

This application is a continuation-in-part of application Serial No. 519,629, filed July 1, 1955, now abandoned.

I claim:

1. A method which comprises reacting boric acid with lauryl alcohol, in dimethyl sulfoxide solution, while controlling the temperature to promote said reaction, to form lauryl borate.

2. In the transesterification of a carboxylic acid ester of the formula R—COOR' with an alcohol of the formula R"OH having a boiling point higher than that of water to form a second ester of the formula R—COOR" and a second alcohol of the formula R'OH, each of said groups R', R" and R being of the class consisting of hydrocarbon and oxygen-containing hydrocarbon, said oxygen being in no form other than hydroxyl, oxo, ether and carboxyl groups, said groups R' and R" containing no reactive groups that are more reactive with respect to acid, ester and sulfoxide than hydroxyl groups, said group R containing no reactive group that is more reactive with respect to alcohol, ester and sulfoxide than the R—CO group, the improvement which comprises carrying out said transesterification in the presence of a low molecular weight sulfoxide solvent while controlling the temperature to promote said transesterification reaction, said sulfoxide being a member of the group consisting of (1) alkyl sulfoxides having the structure

wherein R''' and R'''' are alkyl groups having 1 to 4 carbon atoms; (2) heterocyclic sulfoxides having the structural formula

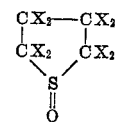

wherein X is a member of the group consisting of H and a lower alkyl group, not more than two X's being an alkyl group and the remainder being an H; and (3) heterocyclic sulfoxides having the structural formula

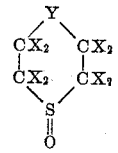

wherein Y is a member of the group consisting of S=O and $CX_2$ wherein X has the meaning hereinbefore given and not more than two X's are an alkyl group and the remainder are an H.

3. The method of claim 2 wherein the sulfoxide has the structure

wherein R''' and R'''' are alkyl groups having 1 to 4 carbon atoms.

4. The method of claim 2 wherein the sulfoxide is dimethyl sulfoxide.

5. The method of claim 2 in which the first-mentioned alcohol is a polyhydric alcohol.

6. The method of claim 5 in which the group R—CO of the ester R—COOR' is the acyl group of a carboxylic acid having 2 to 19 carbon atoms.

7. The method of claim 6 in which the group R' is an alkyl group having 1 to 8 carbon atoms.

8. The method of claim 2 in which the first named alcohol is a member of the group consisting of glycerol, erythritol, pentaerythritol, sucrose, sorbitol, mannitol and fatty esters thereof.

9. The method of claim 8 in which the polyhydric alcohol is sucrose.

10. The method of claim 2 in which the said sulfoxide is diethyl sulfoxide.

11. The method of claim 2 in which the sulfoxide solvent is dibutyl sulfoxide.

12. In the transesterification of a carboxylic acid ester of the formula R—COOR' with an acid of the formula R"COOH having a boiling point higher than that of water to form a second ester of the formula R"COOR' and a second acid of the formula R—COOH, each of said groups R, R' and R" being of the class consisting of hydrocarbon and oxygen-containing hydrocarbon, said oxygen being in no form other than hydroxyl, oxo, ether and carboxyl groups, said group R' containing no reactive group that is more reactive with respect to acid, ester and sulfoxide than hydroxyl groups, said groups R and R" containing no reactive group that is more reactive with respect to alcohol, ester and sulfoxide than the R—CO group, the improvement which comprises carrying out said transesterification in the presence of a low molecular weight sulfoxide solvent while controlling the temperature to promote said transesterification reaction, said sulfoxide being a member of the group consisting of (1) alkyl sulfoxides having the structure

wherein R''' and R'''' are alkyl groups having 1 to 4 carbon atoms; (2) heterocyclic sulfoxides having the structural formula

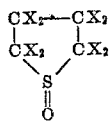

wherein X is a member of the group consisting of H and a lower alkyl group, not more than two X's being an alkyl group and the remainder being an H; and (3) heterocyclic sulfoxides having the structural formula

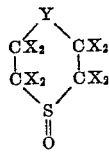

wherein Y is a member of the group consisting of S=O and $CX_2$ wherein X has the meaning hereinbefore given and not more than two X's are an alkyl group and the remainder are an H.

13. The method of claim 12 wherein the group R" is hydrocarbon and the sulfoxide has the structure

wherein R''' and R'''' are alkyl groups having 1 to 4 carbon atoms.

14. In the esterification of a carboxylic acid of the formula R—COOH with an alcohol of the formula R'OH having a boiling point higher than that of water to form an ester of the formula R—COOR', each of said groups R and R' being of the class consisting of hydrocarbon and oxygen-containing hydrocarbon, said oxygen being in no form other than hydroxyl, oxo, ether and carboxyl groups, said group R' containing no reactive group that is more reactive with respect to acid, ester and sulfoxide than hydroxyl groups, said group R containing no reactive group that is more reactive with respect of alcohol, ester and sulfoxide than the R—CO group, the improvement which comprises carrying out said esterification in the presence of a low molecular weight sulfoxide solvent, while controlling the temperature to promote said esterification reaction, said sulfoxide being a member of the group consisting of (1) alkyl sulfoxides having the structure

wherein R''' and R'''' are alkyl groups having 1 to 4 carbon atoms; (2) heterocyclic sulfoxides having the structural formula

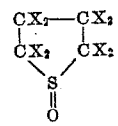

wherein X is a member of the group consisting of H and a lower alkyl group, not more than two X's being an alkyl group and the remainder being an H; and (3) heterocyclic sulfoxides having the structural formula

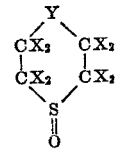

wherein Y is a member of the group consisting of S=O and $CX_2$ wherein X has the meaning hereinbefore given and not more than two X's are an alkyl group and the remainder are an H.

15. The method of claim 14 wherein the sulfoxide has the structure

wherein R''' and R'''' are alkyl groups having 1 to 4 carbon atoms.

16. The method of claim 14 wherein the sulfoxide is

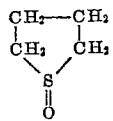

17. The method of claim 14 wherein the alcohol is a polyhydric alcohol.

18. The method of claim 17 wherein the alcohol is ethylene glycol, the acid is phthalic acid, the ester is a polyester resin and the sulfoxide has the structure

wherein R''' and R'''' are alkyl groups having 1 to 4 carbon atoms.

19. A method which comprises reacting sucrose and a higher fatty acid to form the sucrose ester while controlling the temperature to promote said esterification reaction in a solvent having the structure

wherein R''' and R'''' are alkyl groups having 1 to 4 carbon atoms.

20. The method which comprises reacting an alkali metal isethionate with a fatty acid ester to produce an ester of said isethionate and said fatty acid while controlling the temperature to promote said esterification reaction in a sulfoxide solvent of the group consisting of (1) alkyl sulfoxides having the structure

wherein R''' and R'''' are alkyl groups having 1 to 4 carbon atoms; (2) heterocyclic sulfoxides having the structural formula

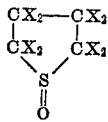

wherein X is a member of the group consisting of H and a lower alkyl group, not more than two X's being an alkyl group and the remainder being an H; and (3) heterocyclic sulfoxides having the structural formula

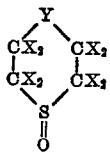

wherein Y is a member of the group consisting of S=O and $CX_2$ wherein X has the meaning hereinbefore given and not more than two X's are an alkyl group and the remainder are an H.

21. A method which comprises reacting an alkali metal isethionate and a fatty acid to produce an ester while controlling the temperature to promote said esterification reaction in a sulfoxide solvent of the group consisting of (1) alkyl sulfoxides having the structure

wherein R''' and R'''' are alkyl groups having 1 to 4 carbon atoms; (2) heterocyclic sulfoxides having the structural formula

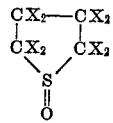

wherein X is a member of the group consisting of H and a lower alkyl group, not more than two X's being an alkyl group and the remainder being an H; and (3) heterocyclic sulfoxides having the structural formula

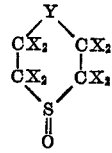

wherein Y is a member of the group consisting of S=O and $CX_2$ wherein X has the meaning hereinbefore given and not more than two X's are an alkyl group and the remainder are an H.

References Cited in the file of this patent
UNITED STATES PATENTS

| | | |
|---|---|---|
| 1,840,395 | Johnson | Jan. 12, 1932 |
| 2,012,622 | Borglin | Aug. 27, 1935 |
| 2,089,375 | Humphrey et al. | Aug. 10, 1937 |
| 2,365,898 | Morris et al. | Dec. 26, 1944 |
| 2,465,319 | Whinfield et al. | Mar. 22, 1949 |
| 2,744,096 | Caldwell | May 1, 1956 |
| 2,744,097 | Caldwell | May 1, 1956 |
| 2,812,324 | Huber | Nov. 5, 1957 |
| 2,893,990 | Hass et al. | July 7, 1959 |

OTHER REFERENCES

Dept. of Agr. Bulletin No. AIC–309, September 1951, p. 1–9.

UNITED STATES PATENT OFFICE
CERTIFICATE OF CORRECTION

Patent No. 3,023,183                 February 27, 1962

Douglas C. Nelson

It is hereby certified that error appears in the above numbered patent requiring correction and that the said Letters Patent should read as corrected below.

Column 1, line 22, the lower right-hand portion of REACTION 1, for "$H_3O$" read -- $H_2O$ --; column 6, line 2, for "contained" read -- contain --; column 7, line 60, for "20 mol phthalic acid" read -- 20 mols diethyl sulfoxide --; column 14 list of references cited, under "UNITED STATES PATENTS, insert -- 1,739,863 Rosenthal et al.----Dec. 17, 1929 --; same column 14, line 38, for "1-9" read -- 1-4 --.

Signed and sealed this 3rd day of July 1962.

(SEAL)
Attest:

ERNEST W. SWIDER
Attesting Officer

DAVID L. LADD
Commissioner of Patents